United States Patent [19]

Landry et al.

[11] Patent Number: 4,915,139
[45] Date of Patent: Apr. 10, 1990

[54] HEAT SHRINKABLE TUBING ARTICLE

[75] Inventors: Louis G. Landry, Somersworth; Benoit L. Poulin, Hudson, both of N.H.

[73] Assignee: Essex Group, Inc., Fort Wayne, Ind.

[21] Appl. No.: 259,462

[22] Filed: Oct. 17, 1988

Related U.S. Application Data

[63] Continuation of Ser. No. 115,289, Nov. 2, 1987, abandoned.

[51] Int. Cl.⁴ .................. F16L 11/12; H02G 13/06
[52] U.S. Cl. .................. 138/125; 138/103; 138/141; 138/174; 138/178; 174/DIG. 8; 428/34.9
[58] Field of Search ............ 138/118.1, 119, 103, 138/137, 124, 125, 126, 140, 141, 177, 172, 174, 178; 428/35, 36, 913, 34.9; 174/DIG. 8; 16/116 R

[56] References Cited

U.S. PATENT DOCUMENTS

| | | | |
|---|---|---|---|
| 3,184,358 | 5/1965 | Utz | 174/DIG. 8 |
| 3,243,211 | 3/1966 | Wetmore | 174/DIG. 8 X |
| 3,253,618 | 5/1966 | Cook | 138/125 |
| 3,253,619 | 5/1966 | Cook et al. | 138/125 |
| 3,448,182 | 6/1969 | Derbyshire et al. | 174/DIG. 8 |
| 3,582,457 | 6/1971 | Barthell | 174/DIG. 8 |
| 3,861,972 | 1/1975 | Glover et al. | 138/103 X |
| 4,195,106 | 3/1980 | Beusselmans | 174/DIG. 8 |
| 4,373,554 | 2/1983 | Cook | 138/137 |
| 4,631,098 | 12/1986 | Pithouse et al. | 174/DIG. 8 |

FOREIGN PATENT DOCUMENTS 1294665 11/1972 United Kingdom ......... 174/DIG. 8

Primary Examiner—James E. Bryant, III
Attorney, Agent, or Firm—Allegretti & Witcoff, Ltd.

[57] ABSTRACT

A heat deformable tube having a melt liner of noncross-liquid, thermoplastic material, such that upon heating to a temperature high enough to cause the tube to return to its original shape; the melt liner melts and encapsulates the substrate.

4 Claims, 1 Drawing Sheet

FIG. 1
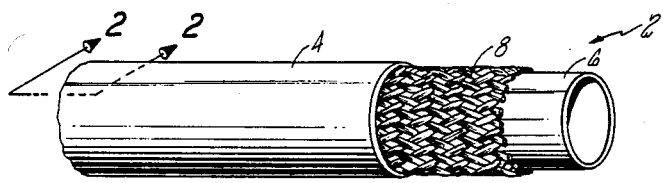
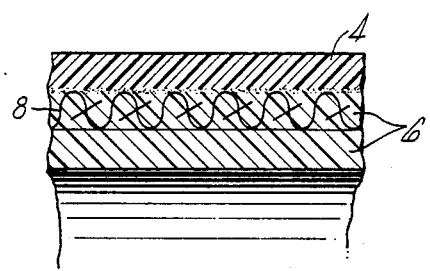
FIG. 2

HEAT SHRINKABLE TUBING ARTICLE

This application is a continuation of application Ser. No. 115,289 filed Nov. 2, 1987, abandoned.

TECHNICAL FIELD

The present invention relates to the field of heat deformable articles and their method of manufacture and application. More particularly the field of fiber reinforced heat deformable articles.

BACKGROUND OF THE INVENTION

In the past, heat deformable products have been used to hold items together, i.e. a bundle of wire or to protect the surface of some article to allow for a better grip, i.e. a handlebar. All of these objectives were achieved by placing a heat shrinkable tube about the article and applying heat to cause the tube to shrink and conform tightly about the article.

However, there have been certain objectives to which such shrinkable tubing would lend itself except for the fact that, although the tube shrinks snugly about the article, it does not result in a water-tight or dust-tight seal nor does the tubing offer effective cut through resistance.

The use of a melt liner bonded to the shrinkable tube which, upon heating of the tube (and thereby causing it to shrink about the article) caused the melt liner to flow in an attempt to fill the voids and seal the article within the shrunken tubing is one approach to solving the sealing problem. However, this did not solve the cut through resistance shortcomings of these tubes or sleeves.

In those heat shrinkable sleeves having fiber reinforcement introduced into them it has been found that unless specific requirements are adhered to the fiber reinforcement interferes with the shrink tubing when it is caused to return to its original shape (as described in U.S. Pat. Nos. 3,253,618 and 3,253,619).

Therefore, what is needed in this art is a heat deformable article having a melt liner which flows easily and uniformly resulting in a more complete sealing of the enclosed article and which contains a fiber reinforcement layer to improve the cut through resistance of the shrunken article.

DISCLOSURE OF INVENTION

The present invention is a fiber reinforced heat shrinkable tubular article of heat deformable material which, upon exposure to sufficient heat, will return substantially to its original shape. The tubular article having a thermoplastic melt liner bonded to its inner surface and having a fiber reinforcement layer positioned between the melt liner and the shrink tubing.

Also disclosed is the method of manufacture for such a deformable tubular article of the present invention and a method of encapsulating a substrate using the tubular article of the present invention.

Other features and advantages will be apparent from the specification and claims and from the accompanying drawings which illustrate an embodiment of the invention.

BRIEF DESCRIPTION OF THE DRAWING

FIG. 1 is a perspective view of the present invention broken away to show the individual components.

FIG. 2 is an enlarged sectional view taken along lines 2—2 after the melt liner has been bonded to the shrink tube.

BEST MODE FOR CARRYING OUT THE INVENTION

The heat shrinkable article may be made from any number of conventional compositions which exhibit the requisite memory such that once they are deformed, they will return to substantially their original shape, (predeformed shape) upon exposure to sufficient heat. Such articles and the method of forming them are conventional and well known in the art.

Typical compositions are polymeric materials such as ethylene propylene dieneterpolymer, neoprene, polyvinyl chloride, polyolefins, silicone and other materials. These materials should possess sufficient crystallinity at normal ambient temperatures to maintain the deformed shape, while having sufficient elasticity to return to substantially its predeformed shape when the crystalline structure is raised above its melt temperature.

Some of the materials useful for forming these tubes will inherently possess sufficient crystallinity while other materials will require additions of a copolymer with sufficient crystallinity to allow the material to be deformed and respond to heat properly. The particular materials useful in preparing the copolymers are well known to those skilled in the art.

The tubular structure of heat deformable material is prepared using conventional techniques. Typically, this means passing the polymer material (usually in granular or pellet form), into a heated hopper, where the polymer is melted. The melted polymer is then forced through an extruder barrel to form a tubular shape which is then cooled to below the crystalline melt temperature of the material (below about 100° F.). The tubular structure (which is in the form of a continuous tube) may or may not require that the polymer material be cross-linked prior to further processing. If cross-linking is required, it may be performed using conventional techniques such as by chemical means or by irradiation; i.e. electron beam or atomic pile. One method of cross-linking comprises introducing an organic peroxide into the polymer which is then actuated by passing the tubing through steam and pressure thereby causing the polymer to cross-link.

Typically the tubular structure is then heated to above the crystalline melt temperature and applying sufficient stresses on the heated tube to cause the tube to be deformed in the desired shape. The most common stress is in the radial direction to cause the tube to expand radially thereby creating a tube which, when heated again to a sufficient temperature, will shrink radially.

The manner of applying these stresses are conventional and would be known to those skilled in this art. For example, in preparing a radial heat shrinkable tubing, the tube is heated and is forced about a heated mandrel having a larger outside dimension than the internal dimension of the tube. An alternative method would be to apply a high pressure differential between the inside and outside of the tubing while it is being heated causing the tube to expand.

In all of these cases once the tubing has been deformed it is cooled to below its crystalline melt temperature while still in the deformed condition.

Tubing of this type will generally be produced in predeformed internal diameters of about 3/64 inch to about 4 inches and having wall thicknesses of about 10 mils to about 120 mils or thicker in the expanded state.

Once the tubular structures are formed and then deformed to the desired dimensions, a melt liner is prepared. The term melt liner, for purposes of this invention, means a distinct layer of polymeric material which has the property of reducing its viscosity or melting so that it will flow at or below about the same temperature as that which the tubular article will return to its predeformed shape. The purpose of this melt liner is to seal or encapsulate the articles about which the tubular articles have been placed. The melt liner may be made of any cross-linkable or noncross-linkable material which will melt and flow at the desired temperature and will bond to the surface of the shrink tube thereby fixing the fiber reinforcement layer to the heat shrinkable tube. The choice will depend on the manner of manufacture of the reinforced sleeving.

For instance, if the material chosen is capable of being cross-linked and it is in fact cross-linked, it will likely reduce the flowability of the melt liner during shrinking of the outer tube and therefore, impair the encapsulating ability of the melt liner. It may also not allow the shrink tube to move relative to the reinforcing fibers when shrinking, thereby hindering the ability of the shrink tube to shrink properly. The important feature to be considered when selecting a material for use as the melt liner is that it will, during shrinking of the shrink tube, melt and flow due to a reduction in its viscosity due to heating and flow easily so that encapsulation occurs. Therefore, the manner of manufacture may dictate the selection of whether the material is cross-linkable or noncross-linkable. As may be seen in the example, a radiation, cross-linkable material is used, however, the method of manufacture is such that no cross-linking of the melt is achieved. If the article were coextruded and then the shrink tube were irradiated in order to cross-link the outer tube, and also cause a certain amount of cross-linking of the melt liner if it was subject to such cross-linking, a noncross-linkable material should be selected. In the preferred mode, the thermoplastic material is cross-linkable, particularly radiation cross-linkable, but is not cross-linked in the final product.

Some materials which are useful as melt liners for this invention are ethylene-vinyl acetate, ethylene vinyl acetate/polyethylene copolymer, other polyolefins, polyurethane elastomers (such as those available from Performance Polymers International of Nashville, Tenn. as C600) and polyamides or acrylics. The preferred material being an ethylene vinyl acetate/polyethylene copolymer having about 5 percent by weight to about 45 percent by weight of ethylene vinyl acetate and most preferably about 20 percent by weight of ethylene vinyl acetate. Typically, these materials will have melt temperatures of about 71.1° C. to about 93.3° C.

The melt liner is formed into a tubular form using any conventional technique. Typically, this will be done in much the same manner as the tubular article disclosed above; wherein the melt liner material is melted in a heated hopper and then extruded in the desired dimension and cooled thereby forming the tube. These tubes should typically have a thickness of from about 6 mils to about 40 mils and when melted will occupy a volume of from two to three times that of the outer jacket. Also the melt liner should have an outside diameter less than that of the inside diameter of the shrink tubing so that it might be inserted easily during the later stages of assembly.

Once the melt liner is made, a layer of fiber reinforcement is woven about the outer surface. This fiber reinforcement may be of any conventional fiber material capable of being applied using conventional textile machines (for purposes of this application, the term woven or weave means either knitting or braiding or other conventional weaving techniques). These fibers may be of nylon, dacron, cotton, glass, etc. One of the preferred materials is electrical grade glass insulation fibers due to their excellent cut-through properties. The diameter or thickness of the fiber is not critical nor is the density at which the material is applied (pics per inch). However, it is important that the fiber reinforcement not be so dense that the melt liner not be able to penetrate the fiber reinforcement and bond to the inner surface of the deformable tube during subsequent processing steps. The fiber reinforcement should cover less than about 90% of the surface area of the melt liner and preferably cover about 30% to about 60%. The weaving process is done using conventional textile equipment and may substantially cover the entire length of the liner's surface.

It should be noted that during the weaving process, the melt liner may become distorted due to the pressure from the fibers as they are woven about the liner. Therefore, it is recommended that the internal cavity of the liner be pressurized to a sufficient pressure to maintain the substantial cylindrical shape during overbraiding. Typical pressures will range from about 2 to about 10 pounds per square inch (psi) and may be achieved with air or nitrogen or other gases. Other methods of maintaining the liner's shape, of course, may be used as well such as a mandrel.

The reinforced melt liner is then inserted into the deformable tube such that the outer surface of the reinforced melt liner substantially contacts the inner surface of the deformable tube. Typically, it is difficult to achieve the desired amount of contact and means must be taken to insure that close contact is made between the two layers so that bonding is complete. This may be accomplished by a procedure wherein one end of the reinforced melt liner is sealed to allow the inside cavity of the liner to be sufficiently pressurized to cause the melt liner to expand and contact the inner surface of the deformable tube. This will generally require pressures in the range of about 2 to about 20 psi. This may be achieved by simply introducing shop compressed air or other gas and then sealing in the air to maintain the contact throughout the unification step. The pressurized reinforced melt liner (or if sufficient contact is made without such pressurization) is then placed in an oven at a temperature sufficient to cause the melt liner to flow through the fiber reinforcement and contact and bond to the inner surface of the deformable tube, yet low enough so as not to cause the deformable tube to return to its predeformed shape.

After the melt liner has bonded to the inner surface of the deformable tube, the sleeve is removed from the oven, cooled and depressurized (if necessary) thus forming the fiber reinforced heat shrinkable tube of the present invention.

EXAMPLE

A heat shrinkable tube of polyvinyl chloride was formed using conventional extrusion techniques to form a tube having an internal diameter of 0.328 mils with a wall thickness of 0.030 mils. The tube was then irradiated, heated and expanded axially using conventional techniques.

The expanded tubing was then cooled to form the heat deformable tube having an internal diameter of 0.657 mils and a wall thickness of 0.015 mils.

A melt liner of ethylene vinyl acetate copolymer having 18 percent vinyl acetate was extruded conventionally to form a tube having an outer diameter of 0.627 mils and a wall thickness of 32 mils. The melt liner was then overbraided on a Butt Braider. During braiding the inner cavity of the melt liner was pressurized to 2 psi and an overbraid of 150⅓ glass fiber yarn was braided about the outer surface of the melt liner. The braid had a density of 7 pics per inch and covered about 45% of the surface area of the outer surface of the melt liner. The overbraid covered substantially the entire length of the melt liner. Once the overbraiding was complete, the liner was depressurized and then removed from the machine.

The overbraided melt liner was cut to 4 foot lengths and inserted into the deformable tube. One end of the deformable tube and the melt liner were then sealed with a clamp and the inner cavity of the melt liner was pressurized to about 7 psi. Then the pressurized sleeve was sealed at the other end and while still pressurized, placed in an oven at 50° to 52° C. for 3.5 minutes. The fiber reinforced heat shrinkable tube was then removed from the oven, cooled and depressurized.

The fiber reinforced heat shrinkable tube formed was a unitary structure which, when applied over a substrate and heated above the crystalline melt temperature of the deformable tube, shrank uniformly and the melt liner flowed easily and completely encapsulated the substrate.

A representative fiber reinforced heat shrinkable tube of the present invention is depicted in FIGS. 1 and 2. FIG. 1 depicts the reinforced tube 2 having an outer shrink tubing 4, an inner layer of a melt liner 6 formed of a noncross-linked thermoplastic, fiber reinforced layer 8 between the melt liner and the shrink tubing. FIG. 2 shows a cross section of the finished unitary sleeve 2 in which the outer shrink tubing 4 and the thermoplastic noncross-linked melt liner 6 has the fiber reinforcement 8 positioned between the melt liner 6 and the shrink tubing 4 in which the melt liner 6 has melted and penetrated the fiber reinforcement 8 to bond to the shrink tubing.

The present invention results in a unitary fiber reinforced heat shrinkable tube having a melt liner. It is the ability of the thermoplastic melt liner to bond through the fiber reinforcement to the inner surface of the shrink tube, yet at the temperatures at which the shrink tubing is caused to deform the melt liner flows easily thereby encapsulating the covered article and also permitting the shrink tubing to move in relationship to the fiber reinforcement resulting in a smooth unbunched attractive finished product. Further, it is the ability of the noncross-linked melt liner to flow easily and at low temperatures to more completely encapsulate or coat the desired article. This is of particular importance where the article is to be protected from moisture and the presence of air bubbles or voids about the article could cause eventual problems should water migrate through these voids. The unique combination of these components results in a unitary fiber reinforced shrink tubing of exceptional characteristics.

While the article herein described constitutes a preferred embodiment of the invention it is to be understood that the invention is not limited, to this precise article and that changes may be made therein without departing from the scope of the invention which is defined in the appended claims.

We claim:

1. A unitary expanded fiber reinforced heat recoverable tubular article comprising:
   a dimensionally expanded heat recoverable tube having an inner surface and an inner dimension, a non-cross linked thermoplastic tube having an outer surface and an outside diameter smaller than the inner diameter of the heat recoverable tube and a braided non-heat recoverable fiber reinforcement positioned between the heat recoverable tube and the thermoplastic tube wherein the braided non-heat recoverable fiber reinforcement is bonded to the heat recoverable tube by the thermoplastic tube at a temperature sufficient to cause the thermoplastic tube to flow through the braided non-heat recoverable fiber reinforcement but insufficient to cause the expanded heat recoverable tube to recover and thereby providing a means to allow the thermoplastic tube to melt and flow at the temperature at which the heat recoverable tube recovers, thereby permitting the heat recoverable tube to move relative to the braided fiber reinforcement.

2. The article of claim 1 wherein said non-cross linked thermoplastic tube is a copolymer of ethylene vinyl acetate and polyethylene.

3. The article of claim 2 wherein the fiber reinforcement is glass fiber.

4. The article of claim 1 wherein said non-cross linked thermoplastic tube has a thickness of about 4 mils to about 40 mils.

* * * * *

UNITED STATES PATENT AND TRADEMARK OFFICE
CERTIFICATE OF CORRECTION

PATENT NO. : 4,915,139

DATED : April 10, 1990

INVENTOR(S) : Louis G. Landry et al.

It is certified that error appears in the above-identified patent and that said Letters Patent is hereby corrected as shown below:

On the title page item
[75] Inventors: The inventor -- Fabian Nunez, Dover, N.H. -- should be inserted after "Benoit L. Poulin, Hudson, both of N.H.".

Signed and Sealed this

Ninth Day of April, 1991

Attest:

HARRY F. MANBECK, JR.

*Attesting Officer*   Commissioner of Patents and Trademarks